(12) United States Patent
Bui

(10) Patent No.: US 10,251,497 B2
(45) Date of Patent: Apr. 9, 2019

(54) WEIGHTED CAR SEAT LAP PAD

(71) Applicant: Troy Bui, Orlando, FL (US)

(72) Inventor: Troy Bui, Orlando, FL (US)

( * ) Notice: Subject to any disclaimer, the term of this patent is extended or adjusted under 35 U.S.C. 154(b) by 231 days.

(21) Appl. No.: 14/937,322

(22) Filed: Nov. 10, 2015

(65) Prior Publication Data
US 2017/0127854 A1 May 11, 2017

(51) Int. Cl.
| | |
|---|---|
| *A47G 9/00* | (2006.01) |
| *A47C 31/00* | (2006.01) |
| *A47D 15/00* | (2006.01) |
| *A47D 13/08* | (2006.01) |
| *A47C 23/00* | (2006.01) |
| *A47D 1/00* | (2006.01) |
| *A47G 9/02* | (2006.01) |
| *B60N 2/28* | (2006.01) |
| *A47L 13/08* | (2006.01) |

(52) U.S. Cl.
CPC ............ *A47G 9/0223* (2013.01); *A47C 31/00* (2013.01); *A47L 13/08* (2013.01); *B60N 2/28* (2013.01)

(58) Field of Classification Search
CPC .... A47D 15/00; A47D 15/001; A47D 15/003; A47D 15/005; A47D 15/006; A47D 15/008; A47D 13/08; A47D 1/00; A47G 9/1045; A47G 9/1063; A47G 9/00; A47C 31/00; A47C 23/00
See application file for complete search history.

(56) References Cited

U.S. PATENT DOCUMENTS

| | | | |
|---|---|---|---|
| 4,838,611 A | 6/1989 | Talaugon | |
| D309,393 S | 7/1990 | Talaugon | |
| 5,064,245 A | 11/1991 | Stephens | |
| 5,108,152 A * | 4/1992 | Reilly | B60N 2/2839 297/397 |
| 5,519,906 A * | 5/1996 | Fanto-Chan | A47C 20/025 5/631 |
| 5,580,133 A * | 12/1996 | Knox | B60N 2/2812 297/182 |
| 5,586,351 A | 12/1996 | Iye | |
| 5,785,388 A | 7/1998 | Curtis | |
| 5,789,851 A | 8/1998 | Turlot et al. | |
| 6,061,854 A * | 5/2000 | Crowley | A47D 13/083 108/43 |
| 6,354,665 B1 * | 3/2002 | Ross | A47C 4/54 297/250.1 |
| 6,454,352 B1 * | 9/2002 | Konovalov | B60N 2/2881 297/219.12 |
| 6,523,901 B2 | 2/2003 | Smith | |
| 6,641,221 B1 | 11/2003 | Kastlunger | |
| 7,252,330 B2 | 8/2007 | Lincoln | |
| 7,356,861 B1 * | 4/2008 | Pagano | A47D 1/00 297/464 |

(Continued)

*Primary Examiner* — Nicholas F Polito
*Assistant Examiner* — Rahib T Zaman
(74) *Attorney, Agent, or Firm* — Jason T. Daniel, Esq.; Daniel Law Offices, P.A.

(57) ABSTRACT

A weighted car seat pad includes a generally U-shaped main body having a pair of side protrusions that define a recessed buckle area. A retention strap extends across a portion of the recessed buckle area, and an opening is disposed along one side of the pad. A weighted pad insert is removably secured within the main body, and includes a specific weight that is matched to the age group and/or particular condition of a child with whom the pad will be used.

15 Claims, 4 Drawing Sheets

(56) References Cited

U.S. PATENT DOCUMENTS

| | | | |
|---|---|---|---|
| 8,321,977 B1* | 12/2012 | Kummerfeld | A47D 13/083 248/118 |
| 8,695,137 B1* | 4/2014 | Hanson | A47D 15/006 128/869 |
| 8,783,776 B1 | 7/2014 | Perkins | |
| 8,887,333 B2* | 11/2014 | Cohen | A47C 7/383 5/636 |
| 2003/0164631 A1* | 9/2003 | Sedlack | A47D 13/02 297/250.1 |
| 2005/0225137 A1* | 10/2005 | Mead | A47D 13/107 297/250.1 |
| 2009/0053432 A1* | 2/2009 | Metz-Topodas | A47D 15/003 428/33 |
| 2011/0119833 A1* | 5/2011 | Clark | A47D 13/083 5/655 |
| 2011/0204687 A1* | 8/2011 | Bishop | A47D 15/006 297/219.12 |
| 2011/0213298 A1* | 9/2011 | Pinnisi | A61J 7/0023 604/77 |
| 2014/0083880 A1* | 3/2014 | Linton | A45C 3/001 206/281 |

* cited by examiner

WEIGHTED CAR SEAT LAP PAD

TECHNICAL FIELD

The present invention relates generally to child accessories, and more particularly to a weighted car seat pad that can provide soothing comfort and security to children.

BACKGROUND

The statements in this section merely provide background information related to the present disclosure and may not constitute prior art.

As any parent will attest, there is nothing more important than the safety of your child. For this reason, manufacturers of child seats such as car seats, booster seats, child wheelchairs, strollers, and highchairs, for example, spend a great deal of time and money to ensure their products meet or exceed safety standards. As such, secondary items that function to provide additional comfort and/or soothing to a child must not interfere with the restraint and/or safety features of the seat.

Regardless of how safe a child seat is, the simple fact remains that young children quickly become upset when they are placed into such a seat. Whether the child is undergoing a bout of anxiety, colic or they are simply restless, the inability of young children to self soothe causes the displeasure of the child to increase exponentially the longer he or she remains in the seat.

For this reason, there are many known products that are designed to afford some level of comfort to children when riding in a car seat. Among the most popular products include a white noise machine and a child pacifier. Although useful in their own rights, neither product makes physical contact with the body of the child in a manner that imparts a sense of security and/or comfort to the child in the same or similar manner as what the child would experience if they were being held by a parent.

Accordingly, it would be beneficial to provide a weighted car seat lap pad that can provide a feeling of security to a young child while not interfering with the safety features of a child seat.

SUMMARY OF THE INVENTION

The present invention is directed to a weighted car seat pad. One embodiment of the present invention can include a generally U-shaped main body having a pair of side protrusions that define a recessed buckle area. The recessed buckle area includes a shape and size that is conducive to receiving a safety restraint buckle from a child car seat. In one embodiment, a retention strap extends across a portion of the recessed buckle area and functions to secure the pad onto the seat.

Another embodiment of the present invention can include a weighted pad insert which can be secured within the main body via an opening along one side of the pad. The insert can be constructed from a wide range of materials and can include a specific weight that is matched to the age group and/or particular condition of a child with whom the pad will be used.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
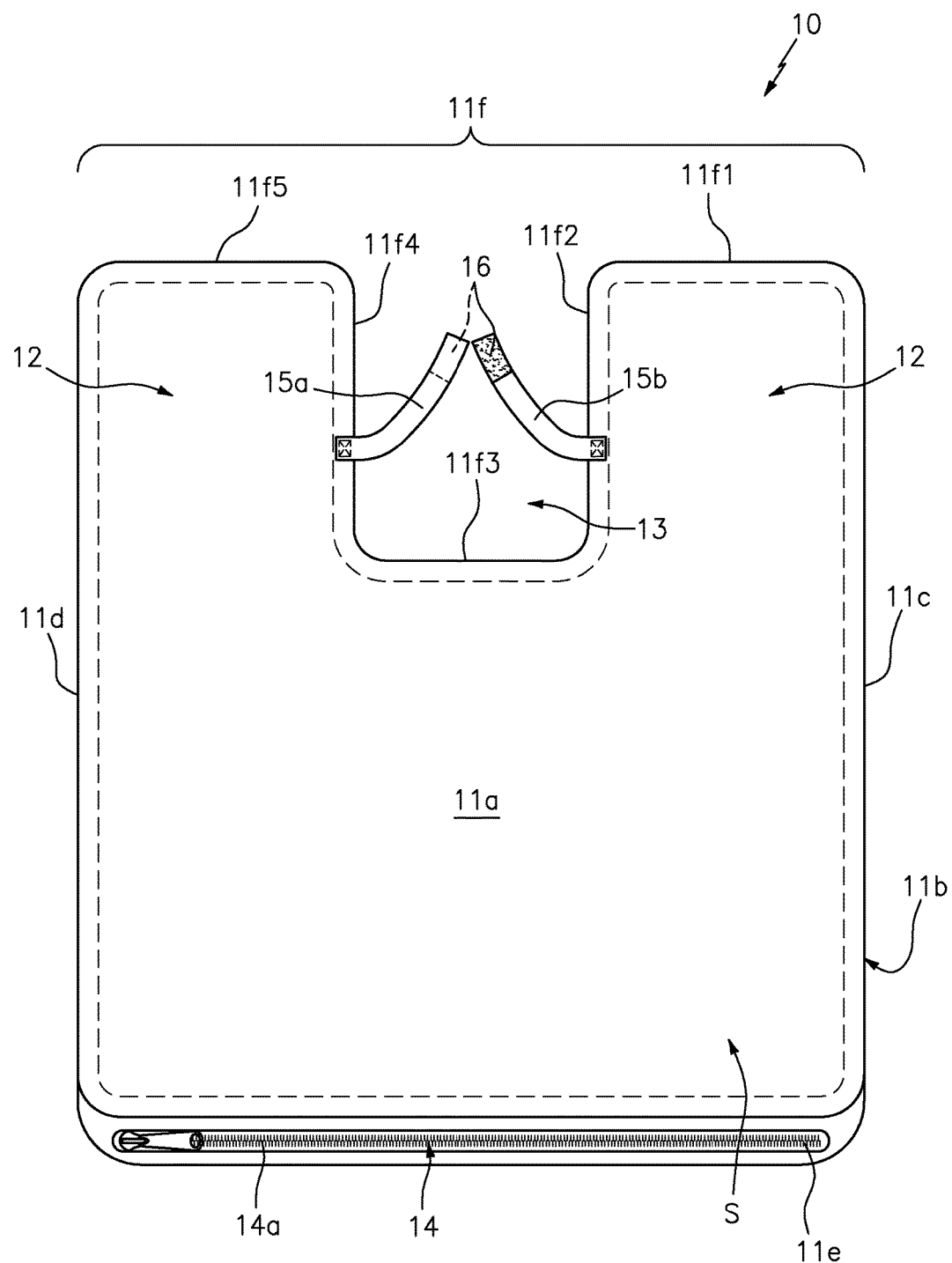
FIG. 1 is a frontal view of the weighted car seat pad that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "complementary shape," and "complementary dimension," shall be used to describe a shape and size of a component that is identical to, or substantially identical to, the shape and size of another component. Likewise, the terms "connector," "complementary connector" and derivatives thereof can include any number of different elements capable of repeatedly securing two items together in a nonpermanent manner. Several nonlimiting examples include opposing strips of hook and loop material (i.e. Velcro®), magnetic elements, tethers such as straps and ties, and compression fittings such as hooks, snaps and buttons, for example. Each illustrated connector can be permanently secured to the illustrated portion of the device via a permanent sealer such as glue, adhesive tape, or stitching, for example.

FIGS. 1-4 illustrate various embodiments of a weighted car seat pad 10 that are useful for understanding the inventive concepts disclosed herein. Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Although described and illustrated for use with a car seat, this is but one possible implementation of the device which can be used by a child at any time and at any location with or without being secured to a child seat. Moreover, the below described "pad" can also be referred to as a "lap pillow" and/or "lap blanket", without limitation. As described herein, the term "dimension" is used to describe an overall size and/or volume of a particular portion of the pad, and more specifically to define the space within the pocket available to receive a removable pad insert. Likewise, the term "shape" is used to describe the physical form of the pad itself.

FIG. 1 illustrates one embodiment of the main body 11 of the pad 10, which can function to receive the removable pad insert 20 described below. In the preferred embodiment, the main body 11 will comprise a generally U-shaped member having a top surface 11a, a bottom surface 11b side surface 11c, side surface 11d, first end 11e and second end 11f. As shown, the second end can include edges 11f1, 11f2, 11f3, 11f4 and 11f5 to create the side protrusions 12 and recessed buckle area 13.

In various embodiments the top and bottom surfaces can be constructed from one or two separate pieces of material which can be joined together along the edges via seams such as stitching, hem tape and/or liquid seams, among many others for example. Such a feature forming an interior pocket space S into which the below described insert 20 can be placed. As shown, a pocket opening 14 can be positioned along the main body, and preferably along the first end 11e. The pocket opening can be selectively sealed via a first connector 14a such as a zipper, for example.

A retention strap can be positioned across the recessed area 13 and can function to create a pathway through which a car seat harness buckle can rest. Such a feature prevents the pad from falling off of the car seat, or being removed by the child. In the preferred embodiment, the retention strap can include substantially identical members 15a and 15b, each having a second connector 16 along the distal ends.

As described herein, the main body 11 can preferably be constructed from a soft material such as cotton, for example, which is a common and widely accepted material for pads, clothing and other such items. Of course, any number of other materials and fabrics such as wool, polyester, flannel, silk, satin, leather, spandex, micro fibers and/or fabric mixes, among many others for example, can also be utilized.

As will be apparent to those of skill in the art, the main body can also include any number and type of decorative elements such as colors, markings, words, shapes, symbols, logos, designs, lights, types of materials, texturing of materials, patterns, images, lithographs, photographs and/or jewels, for example. These elements can be secured onto and/or into the main body in accordance with known techniques so as to be flush with the surface of the main body or can be recessed, raised and/or protruding outward from the main body so as to give a three dimensional effect.

Although size is not critical, in one preferred embodiment, the main body 11 can include a length (e.g., edges 11c and 11d) of approximately 11 inches, and a width (e.g., distance between edges 11c and 11d) of approximately 11 inches. Moreover, it is preferred that inner edge 11f3 includes a length of approximately 2.5 inches, and edges 11f2 and 11f4 each include a length of approximately 4 inches so as to ensure the recessed buckle area 13 is capable of receiving a car seat buckle. Of course, the pad is not limited to these or any other dimensions, as the pad can be constructed in any number of different shapes and dimensions without departing from the overall spirit and scope of the present invention.

Figure 2:
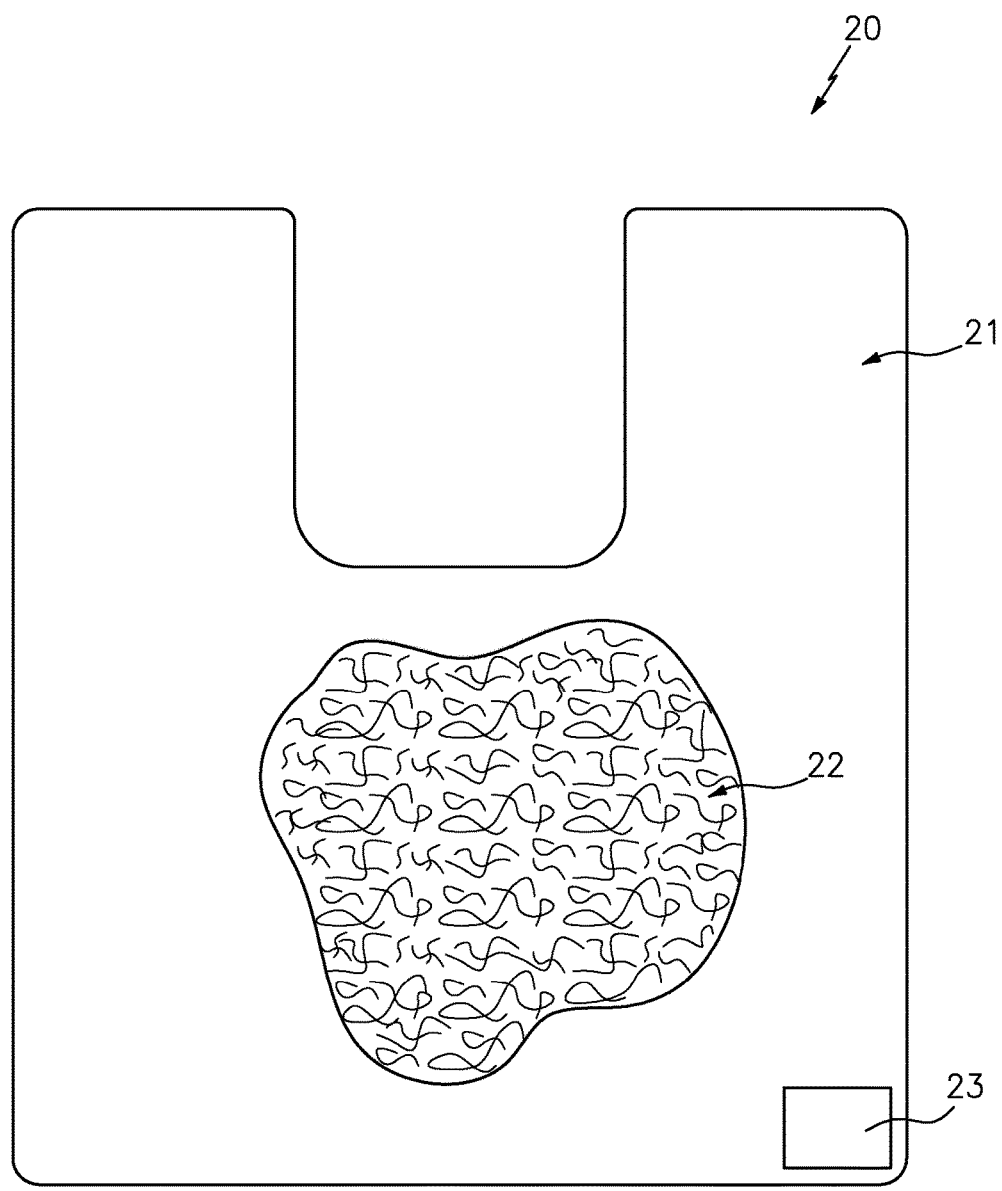
FIG. 2 is a perspective view of a pad insert for use with the main body illustrated in FIG. 1.
Figure 3:
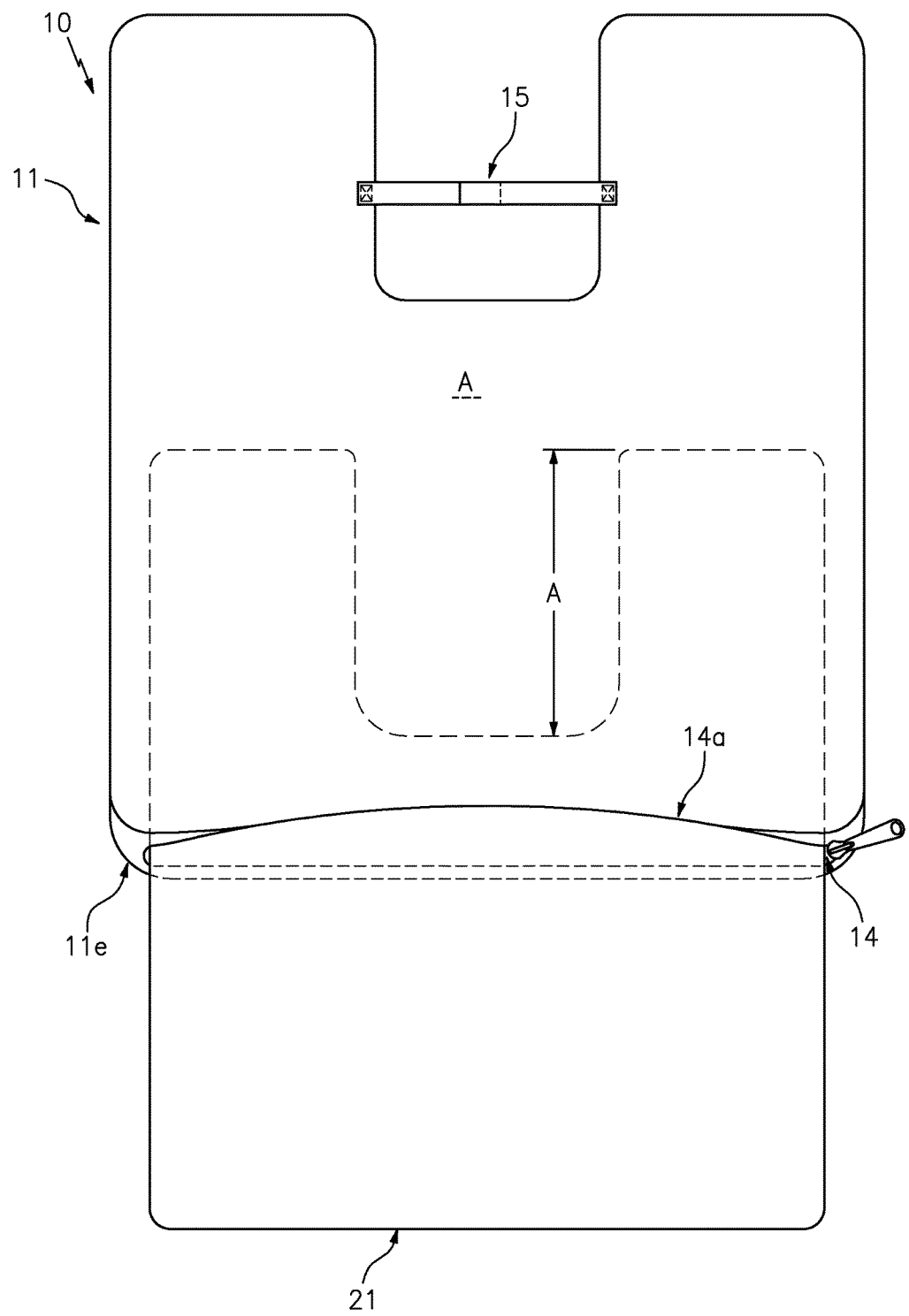
FIG. 3 is a perspective view of the weighted car seat pad, in accordance with one embodiment of the present invention.

FIGS. 2 and 3 illustrate one embodiment of a suitable pad insert 20 which can be utilized with the main body 11. As shown, the pad insert can include an outer casing 21 having a shape and dimension that is complementary to the shape and dimension of the main body 11. As such, the insert 20 can be removably inserted (See arrow A) through opening the 14, so as to be retained within the interior space S of the main body 11.

The casing 21 can be constructed from the same material(s) as the main body, or can be constructed from a different material such as plastic, latex, or rubber, for example, that can function to enclose a batting/fill material 22 such as poly fiber, corn fiber, bamboo fibers, foam, cotton, down, polypropylene beads pellets, polystyrene micro beads, gel, cooling gel, latex, liquids or any other such material that is suitable for prolonged proximity to humans. In either case, it is preferred that the combination of the casing 21 and filler material 22 be suitable for laundering via a conventional washing machine and dryer.

In either instance, the pad insert 20 and fill material 22 can be manufactured to include a specific weight. Such a feature can allow a user to select an insert that best suits the needs and/or age of the child to whom the pad will be utilized. For example, infants and other extremely young children can utilize a pad having a relatively small size and low weight as compared to an older child who can utilize a larger pad and greater weight. Moreover, the same main body 11 can be utilized to house any number of different inserts 20, each having different weights and/or materials. Such a feature can be beneficial to allow a parent to adjust the weight or feel (e.g., density) of the pad based on the particular mood of the child.

Although specific weights are not critical, it is contemplated that the pad insert can include a range of weights between approximately 10 ounces and 2 pounds, for example. Of course, any number of other weights are also contemplated. In either case, each insert 20 can include an identifier 23 such as a physical marking on the pad or a particular color scheme, for example to clearly identify the weight of the pad and/or the intended age of a child to whom the pad is intended to be used. For example, each pad insert can be provided with a chart identifying a suitable pad insert based on the weight of the child for which it is intended to be used. In this scenario, the correct pad will weight approximately 5% of the overall weight of the child.

Figure 4:
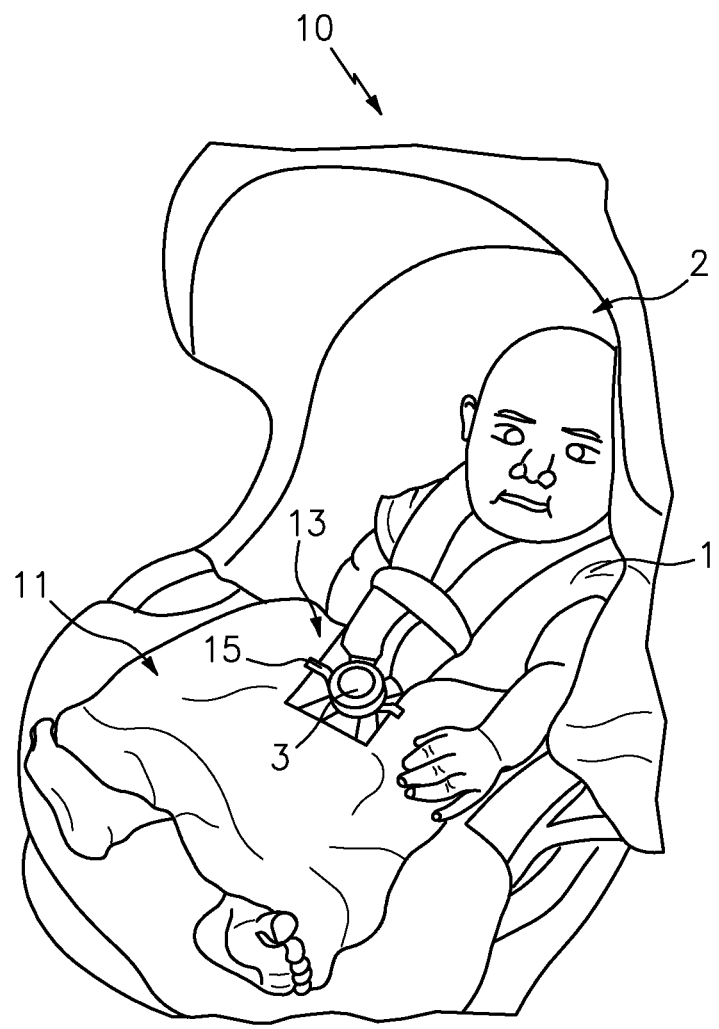
FIG. 4 is a perspective view of the weighted car seat pad in use, in accordance with one embodiment of the present invention.

FIG. 4 illustrates one embodiment of the pad 10 in operation with a child 1 sitting in a car seat 2. As shown, the curved shape of the main body 11 allows the bottom surface of the pad 10 to extend along one side of the child's hip down the length of the child's thigh, across the legs and back up the other side of the child. In this regard, the retention strap 15 removably secures the car seat buckle 3 within the recessed buckle area 13 in a manner that does not interfere with the visibility and/or use and operation of the safety buckle 3. When so positioned, the weight of the pad can impart a comforting and reassuring downforce onto the child which provides the child with a sense of safety and security. Through extensive research and testing, the inventor has discovered that use of the pad 10 as described above greatly aids and helps to soothe, calm and relax children from hyperactivity, anxiety, aggression, fussiness, colic, crankiness and restlessness.

As described herein, one or more elements of the weighted car seat lap pad 10 can be secured together utilizing any number of known attachment means such as, for example, stitching, hem tape and/or liquid sealants, among others. Moreover, although the above embodiments have been described as including separate individual elements, the inventive concepts disclosed herein are not so limiting. To this end, one of skill in the art will recognize that one or more individual elements such as the main body 11 and one or more of the removable pad insert(s) 20 can be permanently secured together at a time of manufacture, thereby removing the need to include the pocket opening 14 and first connector 14a, respectively. Such a feature can be beneficial for allowing a lower cost version of the pad to be produced, while maintaining the ability to provide comfort to a child as described above.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A weighted car seat pad, comprising:
    a main body having a top surface, a bottom surface, a first end, a second end, and a pair of side surfaces that define side protrusions along the second end;
    a recessed buckle area that is configured to receive a car seat buckle, said buckle area being positioned along the second end at a location between the side protrusions, and comprising a shape and a dimension that is complementary to a shape and a dimension of the car seat buckle;
    a pocket area that is disposed within the main body;
    an opening that is disposed along the main body, said opening functioning to provide access to the pocket; and
    a pad insert having a shape and dimension that is complementary to a shape and dimension of the main body, said pad insert including an outer casing, a fill material that is positioned within the outer casing, and a weight identification,
    wherein said weight identification includes a marking on the outer casing that lists a total weight of the pad insert, and a suggested weight of a child to whom the pad insert is intended to be used, and
    wherein the weight of the pad insert is 5% of the suggested weight of the child.

2. The pad of claim 1, further comprising:
    a retention strap that extends between the side protrusions.

3. The pad of claim 2, wherein the retention strap is configured to selectively engage the car seat buckle.

4. The pad of claim 3, wherein the retention strap includes two substantially identical members having connectors along each distal end.

5. The pad of claim 1, wherein the outer casing is constructed from a substantially identical material as the main body.

6. The pad of claim 1, wherein the fill material is constructed from, at least one of, poly fiber, corn fiber, bamboo fibers, foam, cotton, down, polypropylene beads pellets, polystyrene micro beads, gel, cooling gel, latex and liquid.

7. The pad of claim 1, wherein the pad insert is constructed from materials that are suitable for repeated laundering via a washing machine and dryer.

8. The pad of claim 1, wherein the weight identification further includes a chart listing a known manufactured weight of a plurality of different pad inserts, and a suggested weight of a child to whom each of the plurality of different pad inserts are intended to be used.

9. The pad of claim 1, wherein the weight identification includes a color that represents the known manufactured weight of the pad.

10. The pad of claim 1, further comprising:
    a first connector that is disposed along the main body at a location adjacent to the opening, said connector being configured to selectively allow and prevent access to the pocket area.

11. The pad of claim 10, wherein the first connector includes a pair of opposing strips of hook and loop material, or a pair of magnetic elements, or a plurality of compression fittings or a zipper.

12. The pad of claim 1, wherein the weight of the pad insert is 5% of the suggested weight of the child.

13. The pad of claim 12, wherein the weight of the pad is between 10 ounces and 2 pounds.

14. The pad of claim 1, wherein the dimension of the recessed buckle area includes a length of 4 inches, and a width of 2.5 inches.

15. The pad of claim 1, wherein the dimension of the recessed buckle area consists of:
    a length of 4 inches, and a width of 2.5 inches.

* * * * *